United States Patent [19]

Makino et al.

[11] 4,176,219

[45] Nov. 27, 1979

[54] PROCESS FOR THE PRODUCTION OF 1,2-POLYBUTADIENE WITH REGULATED MOLECULAR WEIGHT

[75] Inventors: Kenya Makino, Kuwana; Tsunezo Ishikawa, Suzuka; Koei Komatsu, Tokyo, all of Japan

[73] Assignee: Japan Synthetic Rubber Co., Ltd., Tokyo, Japan

[21] Appl. No.: 910,429

[22] Filed: May 30, 1978

[30] Foreign Application Priority Data

May 30, 1977 [JP] Japan ................. 52-62230

[51] Int. Cl.² ........................................... C08F 4/74
[52] U.S. Cl. ................................ 526/92; 526/139; 526/144
[58] Field of Search ..................... 526/92, 144, 139

[56] References Cited

U.S. PATENT DOCUMENTS

| | | | |
|---|---|---|---|
| 3,284,431 | 11/1966 | Gippin | 526/144 |
| 3,386,983 | 6/1968 | Witte et al. | 526/144 |
| 3,498,963 | 3/1970 | Ichikawa et al. | 260/94.3 |
| 3,928,303 | 12/1975 | Yasui et al. | 526/92 |
| 3,983,183 | 9/1976 | Kampf | 526/139 |

FOREIGN PATENT DOCUMENTS

| | | | |
|---|---|---|---|
| 1157788 | 11/1963 | Fed. Rep. of Germany | 526/144 |
| 45-11916 | 4/1970 | Japan | 526/144 |
| 47-29791 | 8/1972 | Japan | 526/92 |
| 971746 | 10/1964 | United Kingdom | 526/144 |

*Primary Examiner*—William F. Hamrock
*Attorney, Agent, or Firm*—Oblon, Fisher, Spivak, McClelland & Maier

[57] ABSTRACT

In the production of 1,2-polybutadiene by contacting 1,3-butadiene with a catalyst composed of (A) a cobalt compound, (B) an organic phosphine compound, (C) trialkylaluminum and (D) water in an amount of 0.25 to 1.5 moles per mole of said trialkylaluminum, the addition of (E) at least one compound selected from the group consisting of allyl halides, alkyl-substituted allyl halides, benzyl halides, alkyl-substituted benzyl halides, and tertiary aliphatic halides to the reaction system enables the molecular weight of the objective 1,2-polybutadiene to be regulated to any desired value without causing any change in microstructure and degree of crystallization of the product and also without deteriorating so much the polymerization activity.

26 Claims, No Drawings

PROCESS FOR THE PRODUCTION OF 1,2-POLYBUTADIENE WITH REGULATED MOLECULAR WEIGHT

This invention relates to a method for regulating the molecular weight of 1,2-polybutadiene.

The molecular weights of polymers such as rubbery polymers and resinous polymers affect very greatly the physical and mechanical properties and also processability of the polymers. It is therefore desired to produce polymers with the optimum molecular weights in accordance with the purpose of use.

Heretofore, the regulation of the molecular weight of 1,2-polybutadiene has been made by regulating catalyst concentration, catalyst preparation conditions, monomer concentration, polymerization temperature or the like or by adding a molecular weight regulator.

However, these methods for regulating the molecular weight of 1,2-polybutadiene are, in most cases, not necessarily advantageous in product properties, productivity, cost, production apparatus or the like. Particularly, these methods would often cause a drop of the polymerization activity as well as a change in microstructure or degree of crystallization of 1,2-polybutadiene.

As a result of extensive research on a method capable of advantageous production of 1,2-polybutadiene with any regulated molecular weight, the present inventors have found that when 1,3-butadiene is polymerized by using a catalyst composed of (A) a cobalt compound, (B) an organic phosphine compound, (C) trialkylaluminum and (D) water in the presence of (E) at least one compound selected from the group consisting of allyl halides, alkyl-substituted allyl halides, benzyl halides, alkyl-substituted benzyl halides and tertiary aliphatic halides, 1,2-polybutadiene with a regulated molecular weight can be produced without causing any change in microstructure and degree of crystallization and also without deteriorating the polymerization activity so much.

It is therefore an object of this invention to provide a method for the preparation of 1,2-polybutadiene with any desired molecular weight.

Another object of this invention is to provide a method for regulating the molecular weight of 1,2-polybutadiene without deteriorating the polymerization activity or changing the microstructure or degree of crystallization of the product.

Other objects and advantages of this invention will become apparent from the following description.

According to the present invention, there is provided a method for producing 1,2-polybutadiene with a regulated molecular weight which comprises contacting 1,3-butadiene with a catalyst composed of (A) a cobalt compound, (B) an organic phosphine compound, (C) a trialkylaluminum and (D) water in an amount of 0.25 to 1.5 moles per mole of said trialkylaluminum in the presence of (E) at least one compound selected from the group consisting of allyl halides, alkyl-substituted allyl halides, benzyl halides, alkyl-substituted benzyl halides and tertiary aliphatic halides.

In the present method by which polymerization of 1,3-butadiene is effected with the above-mentioned four-component ((A) to (D)) catalyst in the presence of the specified component (E), the molecular weight of the resulting 1,2-polybutadiene can be regulated to any desired value by adjusting the amount of the component (E), without reducing the 1,2-configuration content and degree of crystallization of the resulting 1,2-polybutadiene while maintaining the high polymerization activity.

The cobalt compound used as component (A) of the catalyst in the process of this invention may be selected from a wide variety of cobalt compounds having an apparent valence of from zero to the highest, and the following may be exemplified as preferred examples of such cobalt compounds: cobalt halide, cobalt sulfate, cobalt nitrate, cobalt carbonate, cobalt phosphate, cobalt hydroxide, cobalt cyanate, cobalt thiocyanate, cobalt naphthenate, cobalt octenoate, and complexes having as ligand a carbonyl, isonitrile, vinyl compound, cyclopentadienyl, $\pi$-ally or derivatives thereof, acetylacetone, acetoacetic acid, etc. As more specific examples of these compounds, there may be exemplified cobalt(II) bromide-triphenylphosphine complex, acetylacetone cobalt(II), cobalt octenoate, cobalt naphthenate, cobalt(II) chloride, cobalt(II) bromide, cobalt(II) iodide and complexes of these cobalt halides and pyridine, cobalt ethylxanthogenate, cobalt isopropylxanthogenate, cobalt butylxanthogenate, cobalt phenylxanthogenate, etc. Complexes of the cobalt compounds with the phosphine compounds (component (B)) may also be used. Among these cobalt compounds for use in this invention, most preferable are acetylacetone cobalt(II), cobalt naphthenate, cobalt(II) chloride and cobalt(II) bromide, and complexes of these cobalt compounds with the phosphine compounds.

Component (B) is a phosphine compound represented by the general formula P—(R)$_3$ (wherein R is an alkyl or aryl group), and examples of such phosphine compound include triethylphosphine, triisopropylphosphine, tri-n-butylphosphine, triphenylphosphine, tri-m-phenylphenylphosphine, tri-m-xylylphosphine, tri-m-tolylphosphine and the like. It should be understood that when a complex having an organic phosphine compound as ligant, such as, for example, a bis(triphenylphosphine) complex of cobalt chloride or bromide, a bis(tri-m-xylylphosphine) complex of cobalt chloride or bromide or a bis(tri-m-tolylphosphine) complex of cobalt chloride or bromide, is used as the cobalt compound of component (A), there is no need of additionally using the component (B).

The organoaluminum compound used as component (C) in the process of this invention is chosen from those represented by the general formula: AlR$_3$ (wherein R is an alkyl group). The alkyl group may be either of the straight chain type or of the branched chain type, but it is preferred that such an alkyl group has 1 to 6 carbon atoms. Preferred examples of the organoaluminum compounds are trimethylaluminium, triethylaluminum, triisobutylaluminum, trihexylaluminum, and the like.

As component (E), the following compounds may be exemplified: (a) Allyl halides and alkyl-substituted allyl halides, such as allyl chloride, allyl bromide, allyl iodide, crotyl chloride, crotyl bromide, 1-bromo-2-butene, 1-chloro-2-butene, 1-bromo-2-methyl-2-propene, etc., among which allyl chloride and allyl bromide are most preferable; (b) benzyl halides, and alkyl-substituted benzyl halides, such as benzyl chloride, benzyl bromode, benzyl iodide, p-methylbenzyl chloride, p-methylbenzyl bromide, o-methylbenzyl chloride, m-methylbenzyl chloride, p-tert-butylbenzyl chloride, etc., among which benzyl chloride, benzyl bromide and p-methylbenzyl chloride are most preferable; and (c) tertiary aliphatic halides, such as tert-butyl chloride, tert-butyl bromide, 2-chloro-2-methylbutane, 2-bromo-2-methylbutane, 2-chloro-2-methylpentane, 2-chloro-2- methylhexane, etc., among which tert-butyl chloride and tert-butyl bromide are preferred. These compounds (E) may be used in combination of two or more. Further, these compounds (E) may be used either as they are or in the form of a dilution with a solvent or a monomer. The amount of the compound (E) used in the process of this invention is within the range of 0.01 to 10 moles, preferably 0.05 to 5 moles, more preferably 0.1 to 3 moles, per mole of the catalyst component (C). Use of more than 10 moles of the compound (E) results in a deterioration of polymerization activity, while use of less than 0.01 mole of said compound cannot exhibit a satisfactory effect of regulating the molecular weight.

The molar ratio of the cobalt compound to the organoaluminum compound is usually from 1/1 to 1/1,000, preferably from 1/5 to 1/100, but since the vinyl content and the degree of crystallization of the polymer obtained are not so much affected by said ratio, the mixing proportions of the respective components may be suitably selected depending on the polymerization activity and the desired molecular weight of the product.

The amount of water added as component (D) in the process of this invention is closely associated with the amount of organoaluminum compound added. It is important that water is added in an amount of 0.25 to 1.5 mols per mol of the organoaluminum compound. If the amount of water is less than 0.25 mols or more than 1.5 mols per mol of the organoaluminum compound, there results an excess reduction of the polymerization activity of the catalyst. The preferred amount of water is 0.5 to 1.0 mol per mol of the organoaluminum compound. The term "amount of water" as used above means the total amount of water present in the entire polymerization system.

The organic phosphine compound, namely component (B) of the catalyst, is used in an amount of not less than 0.2 mols, usually 0.2 to 50 mols, preferably 1 to 10 mols, per mol of the cobalt compound. Polybutadiene with 1,4-configuration is produced in a major amount if the amount of the organic phosphine compound added is less than 0.2 mols. When the amount of the organic phosphine compound added is too large, polymerization activity is deteriorated.

The polymerization reaction of this invention may be conducted either continuously or batchwise by contacting 1,3-butadiene with the above-specified catalyst in a solvent. The amount of the catalyst used in the polymerization reaction is usually about 0.001 to 1 mmol, preferably 0.01 to 0.5 mmol in terms of the cobalt compound per mol of the butadiene.

In practicing the process of this invention, the following orders of addition of the respective components are recommended.

(a) Solvent, water (D), 1,3-butadiene, trialkylaluminum (C), molecular weight regulator (E) and cobalt compound (A) are added in this order.

(b) Solvent, 1,3-butadiene, (E), (C), (D) and (A) are added in this order.

(c) (C) and (E), which have been previously mixed and aged, are added to a mixture of solvent, 1,3-butadiene and (D), and finally (A) is added thereto.

(d) (E) and a part of (C), which have been previously mixed and aged, are added together with the remainder of (C) to a mixture of the solvent, 1,3-butadiene and (D), and finally (A) is added.

In this invention, the use of an aged mixture of a part or the whole of trialkylaluminum (C) and the molecular weight regulator (E) can produce a greater effect of regulating the molecular weight without deteriolating the polymerization activity than the use of a non-aged mixture can. For this reason, the above-mentioned addition order (c) or (d) is preferred.

The polymerization solvent used in this invention may be a hydrocarbon or halogenated hydrocarbon solvent. Examples of the hydrocarbon solvents usable in this invention are benzene, toluene, n-pentane, n-hexane, cyclohexane and the like, and examples of the halogenated hydrocarbon solvents are methylene chloride, chloroform, chlorobenzene and the like. It is preferred to use a halogenated hydrocarbon solvent. Methylene chloride is most preferable.

The polymerization reaction in the process of this invention can be accomplished at a temperature ranging from −40° C. to 100° C., preferably −20° to 80° C., at a pressure sufficient to maintain the reaction mixture substantially in the liquid phase.

1,2-Polybutadiene obtained according to this invention finds its practical application for a wide variety of uses either singly or in combination with other materials such as rubber or resin. The typical and recommended uses of this polymer are films, various kinds of tubes and hoses, heat-fusible adhesives, various types of molded articles such as footwear and the like, photosensitive resin materials and the like.

The invention is further explained in detail below referring to Examples. However, it should be understood that the Examples are not by way of limitation but by way of illustration.

In the Examples and Comparative Examples, the intrinsic viscosity $[\eta]$ of the polymer was calculated from the viscosity as measured in toluene at 30° C., and the microstructure of the polymer was determined from an infrared absorption spectra. The degree of crystallization was determined by the gradient density tube method by setting the density of 1,2-polybutadiene with a degree of crystallization of 0% at 0.892 g/cm$^3$ and the density of 1,2-polybutadiene with a degree of crystallization of 100% at 0.963 g/cm$^3$.

EXAMPLE 1

Into a 100-ml pressure bottle were charged 28 ml of methylene chloride, 0.125 mmol of water (using methylene chloride containing 900 ppm of water), 6 g of 1,3-butadiene, 0.25 mmol of triisobutylaluminum, a predetermined amount of a 0.05 mol/liter methylene chloride solution of allyl bromide, allyl chloride, allyl iodide or benzyl chloride, and 0.005 mmol of cobalt bis(triphenylphosphine) dibromide in this order, and the mixture was subjected to polymerization at 10° C. for one hour. After the polymerization reaction, methanol containing a small quantity of 2,6-di-t.-butyl-p-cresole was added to the solution to terminate the polymerization, and the reaction mixture was then poured into a large quantity of a methanol-hydrochloric acid solution to coagulate the polymer, followed by overnight drying in vacuo at 40° C. The results are shown in Table 1.

COMPARATIVE EXAMPLE 1

The procedure of Example 1 was repeated, except that the halide as the molecular weight regulator was not used. The results are shown in Table 1.

Table 1

| Run No. | Molecular weight regulator Kind | Molecular weight regulator mmol | Yield (%) | $[\eta]_{toluene}^{30°C}$ (dl/g) | 1,2 Configuration (%) | Degree of crystallization (%) |
| --- | --- | --- | --- | --- | --- | --- |
| 1 | Allyl bromide | 0.05 | 94 | 1.10 | 94 | 25.5 |
| 2 | " | 0.1 | 85 | 0.68 | 95 | 26.5 |
| 3 | " | 0.25 | 80 | 0.60 | 95 | 26.4 |
| 4 | Allyl chloride | 0.1 | 87 | 0.79 | 95 | 26.1 |
| 5 | " | 0.25 | 82 | 0.68 | 95 | 26.4 |
| 6 | Allyl iodide | 0.1 | 89 | 0.93 | 95 | 25.8 |
| 7 | " | 0.25 | 79 | 0.71 | 95 | 26.2 |
| 8 | Benzyl chloride | 0.1 | 82 | 0.85 | 95 | 26.0 |
| Comp. Example 1 | None | 0 | 98 | 2.38 | 93 | 24.0 |

EXAMPLE 2

Into a 100-ml pressure bottle were charged 72 g of methylene chloride, 0.048 mmol of water, 6.0 g of 1,3-butadiene, 0.12 mmol of triisobutylaluminum, 0.036 mmol of benzyl chloride and 0.008 mmol of cobalt bis(tri-m-xylylphosphine) dibromide in this order and the mixture was subjected to polymerization at 5° C. for one hour (Run No. 9). A similar polymerization was conducted under the same conditions as above, except that a mixture of triisobutylaluminum and benzyl chloride which had been previously prepared and aged at 40° C. for one hour was used (Run No. 10). After the polymerization reaction, the reaction mixture was treated in the same manner as in Example 1 to obtain the results shown in Table 2.

COMPARATIVE EXAMPLE 2

The same procedure as in Example 2 was repeated, except that the molecular weight regulator was not used. The results obtained are shown in Table 2.

EXAMPLE 3

Into a 100-ml pressure bottle were charged 72 g of methylene chloride, 0.048 mmol of water, 6.0 g of 1,3-butadiene and a mixture prepared previously by mixing 0.12 mmol of triisobutylaluminum and a predetermined amount of a molecular weight regulator and aging the resulting solution at 40° C. for one hour in this order, and 0.008 mmol of cobalt bis(tri-m-xylylphosphine) dibromide was then added thereto. The resulting mixture was subjected to polymerization at 5° C. for one hour. After the polymerization reaction, the reaction mixture was treated in the same manner as in Example 1 to obtain the results shown in Table 3.

COMPARATIVE EXAMPLE 3

The same procedure as in Example 3 was repeated, except that the molecular weight regulator was not used. The results obtained are shown in Table 3.

Table 2

| Run No. | Molecular weight regulator Kind | Molecular weight regulator Aging | Yield (%) | $[\eta]_{toluene}^{30°C}$ (dl/g) | 1,2-Configuration (%) | Degree of crystallization (%) |
| --- | --- | --- | --- | --- | --- | --- |
| 9 | Benzyl chloride | Not aged | 85 | 1.74 | 95 | 34.2 |
| 10 | Benzyl chloride | Aged | 87 | 1.26 | 95 | 34.6 |
| Comp. Example 2 | None | — | 83 | 2.27 | 94 | 34.4 |

Table 3

| Run No. | Molecular weight regulator Kind | Molecular weight regulator mmol | Yield (%) | $[\eta]_{toluene}^{30°C}$ (dl/g) | 1,2-Configuration (%) | Degree of crystallization (%) |
| --- | --- | --- | --- | --- | --- | --- |
| 11 | Benzyl chloride | 0.015 | 85 | 1.70 | 95 | 34.4 |
| 12 | " | 0.03 | 92 | 1.52 | 95 | 34.2 |
| 13 | " | 0.045 | 86 | 1.31 | 95 | 34.9 |
| 14 | " | 0.06 | 82 | 1.18 | 95 | 34.3 |
| 15 | t-Butyl bromide | 0.015 | 87 | 1.65 | 95 | 34.2 |
| 16 | " | 0.03 | 91 | 1.48 | 94 | 34.1 |
| 17 | " | 0.045 | 80 | 1.12 | 95 | 34.8 |
| 18 | " | 0.06 | 80 | 1.01 | 95 | 33.9 |
| 19 | Allyl bromide | 0.015 | 88 | 1.57 | 95 | 34.3 |
| 20 | " | 0.03 | 87 | 1.53 | 95 | 34.2 |
| 21 | " | 0.045 | 88 | 1.39 | 94 | 33.8 |
| 22 | " | 0.06 | 90 | 1.25 | 95 | 34.1 |
| 23 | Benzyl bromide | 0.015 | 85 | 1.57 | 94 | 34.3 |
| 24 | " | 0.03 | 86 | 1.44 | 95 | 34.0 |
| 25 | " | 0.045 | 80 | 1.21 | 95 | 33.7 |
| 26 Comp. | " | 0.06 | 79 | 1.15 | 95 | 34.2 |

Table 3-continued

| Run No. | Molecular weight regulator Kind | mmol | Yield (%) | $[\eta]_{toluene}^{30°\,C.}$ (dl/g) | 1,2-Configuration (%) | Degree of crystallization (%) |
|---|---|---|---|---|---|---|
| Example 3 | None | — | 85 | 2.27 | 94 | 34.4 |

EXAMPLE 4

The same procedure as in Example 3 was repeated, except that an organic aluminum compound as shown in Table 4 was mixed and aged with an equimolar quantity of a molecular weight regulator as shown in Table 4 at various temperatures, and the thus aged mixture was added to the reaction system together with the remaining amount of the organic aluminum compound. The results obtained are shown in Table 4.

COMPARATIVE EXAMPLES 4 AND 5

The same procedure as in Run No. 27 or 33 in Example 4 was repeated, except that the molecular weight regulator was not used. The results obtained are shown in Table 4.

EXAMPLE 5

The same procedure as in Run No. 27 in Example 4 was repeated, except that 0.12 mmol of triisobutylaluminum was used as the trialkylaluminum compound, the amount of the molecular weight regulator was varied, and a part of this triisobutylaluminum was previously mixed with the molecular weight regulator in a molar ratio of 1:1 and aged at 40° C. for one hour. The results obtained are shown in Table 5.

COMPARATIVE EXAMPLES 6 TO 8

The same procedure as in Run No. 35 in Example 5 was repeated, except that n-butyl chloride (Comparative Example 6), or sec-butyl chloride (Comparative Example 7) was substituted for the t-butyl chloride, or no molecular weight regulator was used (Comparative Example 8). The results obtained are shown in Table 5.

Table 5

| Run No. | Molecular weight regulator Kind | mmol | Yield (%) | $[\eta]_{toluene}^{30°\,C.}$ (dl/g) | 1,2-Configuration (%) | Degree of crystallization (%) |
|---|---|---|---|---|---|---|
| 34 | t-Butyl chloride | 0.012 | 86 | 1.99 | 94 | 34.3 |
| 35 | " | 0.024 | 88 | 1.75 | 95 | 34.0 |
| 36 | " | 0.036 | 83 | 1.62 | 94 | 34.4 |
| Comp. Example 6 | n-Butyl chloride | 0.024 | 84 | 2.24 | 94 | 33.9 |
| Example 7 | sec-Butyl chloride | 0.024 | 88 | 2.24 | 94 | 34.1 |
| Example 8 | None | — | 85 | 2.27 | 94 | 34.4 |

COMPARATIVE EXAMPLES 9–11

Experiments were carried out in the same manner as in Run No. 9 in Example 2, except that an inorganic Table 4

| Run No. | Organic aluminum compound Kind | Al' | Molecular weight regulator Kind | mmol | Aging temp. (°C.) | Yield (%) | $[\eta]_{toluene}^{30°\,C.}$ (dl/g) | 1,2-Configuration (%) | Degree of crystallization (%) |
|---|---|---|---|---|---|---|---|---|---|
| 27 | Triisobutylaluminum | 0.036 | t-Butyl chloride | 0.036 | 40 | 86 | 1.62 | 94 | 34.3 |
| 28 | Triisobutylaluminum | " | t-Butyl chloride | " | 65 | 85 | 1.53 | 94 | 34.1 |
| 29 | Triisobutylaluminum | " | Allyl chloride | " | 40 | 90 | 1.71 | 95 | 34.4 |
| 30 | Triisobutylaluminum | " | Benzyl chloride | " | 40 | 85 | 1.18 | 95 | 34.0 |
| 31 | Triisobutylaluminum | " | Benzyl chloride | " | 65 | 75 | 1.10 | 95 | 34.4 |
| 32 | Triisobutylaluminum | " | Benzyl chloride | " | 90 | 75 | 1.15 | 95 | 34.3 |
| 33 | Triethylaluminum | " | Benzyl chloride | " | 40 | 85 | 1.80 | 93 | 34.0 |
| Comp. Example 4 | Triisobutylaluminum | — | — | — | — | 85 | 2.25 | 94 | 34.4 |
| Comp. Example 5 | Triethylaluminum | — | — | — | — | 87 | 2.52 | 93 | 34.5 |

Note:
Al' is the amount (mmol) of the organic aluminum compound that was previously mixed and aged with the molecular weight regulator (total amount of the organic aluminum compound used was 0.12 mmol).

halide as shown in Table 6 was substituted for the benzyl chloride. The results obtained are shown in Table 6.

Table 6

| Comparative Example No. | Inorganic halide Kind | Amount added (mmol) | Yield (%) | $[\eta]_{toluene}^{30° C.}$ (dl/g) |
|---|---|---|---|---|
| 9 | SiCl$_3$ | 0.012 | 100 | 2.32 |
| 10 | PCl$_3$ | 0.012 | 4 | — |
| 11 | TiCl$_3$ | 0.012 | 5 | — |

EXAMPLE 6

Experiments were conducted in the same manner as in Example 2, except that cobalt bis(tri-m-tolylphosphine) dichloride was substituted for the cobalt compound and p-methylbenzyl chloride was substituted for the molecular weight regulator. The results obtained are shown in Table 7.

COMPARATIVE EXAMPLE 12

The same procedure as in Example 6 was repeated, except that the molecular weight regulator was not used. The results obtained were shown in Table 7.

Table 7

| Run No. | Molecular weight regulator Kind | Aging | Yield (%) | $[\eta]_{toluene}^{30° C.}$ (dl/g) | 1,2-Configuration (%) | Degree of crystallization (%) |
|---|---|---|---|---|---|---|
| 37 | p-Methylbenzyl chloride | Not aged | 87 | 1.30 | 95 | 31.2 |
| 38 | p-Methylbenzyl chloride | Aged | 90 | 1.02 | 95 | 31.1 |
| Comp. Example 12 | None | — | 89 | 1.95 | 95 | 31.1 |

EXAMPLE 7

The same procedure as in run number 9 of Example 2 was repeated, except that cobalt bis(triethylphosphine) dibromide was used and a mixture of 0.018 mmol of benzyl bromide and 0.018 mmol of p-methylbenzyl chloride was used. The result obtained are shown in Table 8.

COMPARATIVE EXAMPLE 13

The same procedure as in Example 7 was repeated, except that neither the benzyl bromide nor the p-methylbenzyl chloride were used. The results obtained are shown in Table 8.

Table 8

| Run No. | Molecular weight regulator | Yield % | $[\eta]_{toluene}^{30° C.}$ (dl/g) | 1,2-Configuration (%) | Degree of crystallization (%) |
|---|---|---|---|---|---|
| 39 | Benzyl bromide p-Methylbenzyl chloride | 89 | 1.05 | 94 | 0 |
| Comp. Example 13 | None | 89 | 1.95 | 95 | 0 |

What is claimed is:

1. A process for producing 1,2-polybutadiene with a regulated molecular weight which comprises contacting 1,3-butadiene with a catalyst composed of (A) a cobalt compound selected from the group consisting of cobalt chloride, cobalt bromide, cobalt iodide, cobalt naphthenate, cobalt octanoate, cobalt trisacetylacetonate, cobalt bisacetylacetonate and cobalt carbonyl, (B) an organic phosphine compound selected from the group consisting of triethylphosphine, triisopropylphosphine, a tri-n-butylphosphine, triphenylphosphine, tri-m-phenylphosphine, tri-m-xylylphosphine, and tri-m-tolylphosphine, (C) a trialkylaluminum and (D) water in an amount of 0.55 to 1.5 moles per mole of said trialkylaluminum in the presence of (E) at least one compound selected from the group consisting of allyl halides, alkyl-substituted allyl halides, benzyl halides, alkyl-substituted benzyl halides, and tertiary aliphatic halides, in an amount of 0.01 to 10 moles of component (E) per mole of component (C).

2. The process according to claim 1, wherein the amount of component (E) is 0.1 to 3 moles per mole of component (C).

3. The process according to claim 1, wherein 1,3-butadiene is contacted with the catalyst at a temperature ranging from −40° C. to 100° C.

4. The process according to any one of claims 1, 2 or 3, wherein components (A) and (B) are used in the form of a complex with each other.

5. The process according to claim 4, wherein the complex is a bis(triphenylphosphine) complex of cobalt chloride or bromide, a bis(tri-m-xylylphosphine) complex of cobalt chloride or bromide or a bis(tri-m-tolylphosphine) complex of cobalt chloride or bromide.

6. The process according to any one of claims 1, 2 or 3, wherein component (C) is trimethylaluminum, triethylaluminum, triisobutylaluminum or trihexylaluminum.

7. The process according to any one of claims 1, 2 or 3, wherein component (E) is selected from the group consisting of allyl halides and alkyl-substituted allyl halides.

8. The process according to claim 7, wherein component (E) is selected from the group consisting of allyl chloride, allyl bromide, allyl iodide, crotyl chloride, crotyl bromide, 1-bromo-2-butene, 1-chloro-2-butene and 1-bromo-2-methyl-2propene.

9. The process according to claim 7, wherein component (E) is allyl chloride or allyl bromide.

10. The process according to any one of claims 1, 2 or 3, wherein component (E) is selected from the group consisting of benzyl halides and alkyl-substituted benzyl halides.

11. The process according to claim 10, wherein component (E) is selected from the group consisting of benzyl chloride, benzyl bromide, benzyl iodide, p-methylbenzyl chloride, p-methylbenzyl bromide, o-methylbenzyl chloride, m-methylbenzyl chloride and p-tert-butylbenzyl chloride.

12. The process according to claim 10, wherein component (E) is benzyl chloride, benzyl bromide or p-methylbenzyl chloride.

13. The process according to any one of claims 1, 2 or 3, wherein component (E) is selected from the group consisting of tertiary aliphatic halides.

14. The process according to claim 13, wherein component (E) is selected from the group consisting of tert-butyl chloride, tert-butyl bromide, 2-chloro-2-methylbutane, 2-bromo-2-methylbutane, 2-chloro-2-methylpentane and 2-chloro-2-methylhexane.

15. The process according to claim 13, wherein component (E) is tert-butyl chloride or tert-butyl bromide.

16. The process according to any one of claims 1, 2 or 3, wherein the contact of 1,3-butadiene with the catalyst in the presence of component (E) is performed in a solvent.

17. The process according to claim 16, wherein the solvent is a hydrocarbon or a halogenated hydrocarbon.

18. The process according to claim 16, wherein the solvent is benzene, toluene, n-pentane, n-hexane or cyclohexane.

19. The process according to claim 16, wherein the solvent is methylene chloride, chloroform or chlorobenzene.

20. The process according to claim 16, wherein the solvent is methylene chloride.

21. The process according to claim 16, wherein the sequential order of addition to the solvent is component (D), butadiene, component (C), component (E) and component (A).

22. The process according to claim 16, wherein the sequential order of addition to the solvent is 1,3-butadiene, component (E), component (C), component (D) and component (A).

23. The process according to claim 16, wherein an aged mixture of component (C) and component (E) is added to a mixture of the solvent, 1,3-butadiene and component (D), and then component (A) is added thereto.

24. The process according to claim 16, wherein an aged mixture of component (E) and a part of component (C) is added to a mixture of the solvent, 1,3-butadiene and component (D), and then the remaining amount of component (C) is added thereto.

25. The process according to claim 1, wherein the amount of the organic phosphine compound is 0.2 to 50 mols per mol of the cobalt compound.

26. The process according to claim 1, wherein the amount of the catalyst used is 0.001 to 1 mmol in terms of the cobalt compound per mol of 1,3-butadiene.

* * * * *